(12) United States Patent
Jiang et al.

(10) Patent No.: US 12,514,654 B2
(45) Date of Patent: Jan. 6, 2026

(54) CONNECTION DEVICE AND SURGICAL NAVIGATION SYSTEM

(71) Applicants: CENTRAL SOUTH UNIVERSITY, Changsha (CN); NINGBO INSTITUTE OF MATERIALS TECHNOLOGY AND ENGINEERING, CHINESE ACADEMY OF SCIENCES, Ningbo (CN)

(72) Inventors: Canhua Jiang, Changsha (CN); Ye Liang, Changsha (CN); Guokun Zuo, Ningbo (CN); Jiaji Zhang, Ningbo (CN); Yutian Zheng, Changsha (CN); Cong Xiao, Ningbo (CN); Tao Song, Ningbo (CN); Hua Deng, Changsha (CN); Ai Jian, Changsha (CN)

(73) Assignees: CENTRAL SOUTH UNIVERSITY, Changsha (CN); NINGBO INSTITUTE OF MATERIALS TECHNOLOGY AND ENGINEERING, CHINESE ACADEMY OF SCIENCES, Ningbo (CN)

( * ) Notice: Subject to any disclaimer, the term of this patent is extended or adjusted under 35 U.S.C. 154(b) by 0 days.

(21) Appl. No.: 18/994,640

(22) PCT Filed: Jun. 5, 2024

(86) PCT No.: PCT/CN2024/097391
§ 371 (c)(1),
(2) Date: Jan. 15, 2025

(87) PCT Pub. No.: WO2024/255653
PCT Pub. Date: Dec. 19, 2024

(65) Prior Publication Data
US 2025/0262001 A1  Aug. 21, 2025

(30) Foreign Application Priority Data

Jun. 14, 2023 (CN) .......................... 202310699928.2

(51) Int. Cl.
*A61B 34/20* (2016.01)

(52) U.S. Cl.
CPC ...... *A61B 34/20* (2016.02); *A61B 2034/2072* (2016.02)

(58) Field of Classification Search
CPC .............................. A61M 39/10; A61B 34/20
(Continued)

(56) References Cited

U.S. PATENT DOCUMENTS 4,211,009 A * 7/1980 Leonard .................... A61C 1/18
433/133
4,354,839 A * 10/1982 Schuss ...................... A61C 1/08
433/82
(Continued)

FOREIGN PATENT DOCUMENTS

CN 2268172 Y 11/1997
CN 203315019 U 12/2013
(Continued)

*Primary Examiner* — Nicholas D Lucchesi
(74) *Attorney, Agent, or Firm* — Bayramoglu Law Offices

(57) ABSTRACT

A connection device and a surgical navigation system are provided. The connection device is configured to connect two adjacent cascade tubes of the surgical navigation system. The connection device includes: a connection tube, a butting tube, a sleeve, and positioning balls. The connection tube and the butting tube are respectively arranged at two ends of the cascade tubes. The butting tube on one of the cascade tubes is configured to sleeve an outer wall of the connection tube on the other cascade tube. The connection tube is provided with a connection protrusion. A connection
(Continued)

slot communicated to the inside of the butting tube is provided in an inner wall of the butting tube.

16 Claims, 5 Drawing Sheets

(58) Field of Classification Search
USPC .......................................................... 433/126
See application file for complete search history.

(56) References Cited

U.S. PATENT DOCUMENTS

| | | | | |
|---|---|---|---|---|
| 4,403,958 | A * | 9/1983 | Lohn | A61C 1/05 |
| | | | | 433/126 |
| 5,039,304 | A * | 8/1991 | Heil | A61C 1/18 |
| | | | | 433/126 |
| 5,165,728 | A * | 11/1992 | Mayer | A61M 39/10 |
| | | | | 285/12 |
| 5,476,379 | A * | 12/1995 | Disel | A61C 1/18 |
| | | | | 433/29 |
| 5,482,413 | A * | 1/1996 | Argaud | A61C 1/05 |
| | | | | 408/239 R |
| 5,489,274 | A * | 2/1996 | Chu | A61M 39/0613 |
| | | | | 604/248 |
| 11,187,364 | B2 * | 11/2021 | Jin | F16L 37/32 |
| 2001/0011042 | A1 * | 8/2001 | Roark | A63B 60/28 |
| | | | | 473/288 |
| 2002/0115039 | A1 * | 8/2002 | Linenhole | A61C 1/0076 |
| | | | | 433/82 |
| 2009/0224534 | A1 * | 9/2009 | Liu | F16L 37/40 |
| | | | | 285/148.14 |
| 2010/0324368 | A1 * | 12/2010 | Mathieu | A61M 39/10 |
| | | | | 600/131 |
| 2013/0187381 | A1 | 7/2013 | Guala | |
| 2016/0243347 | A1 * | 8/2016 | Geiger | A61M 39/20 |
| 2017/0102013 | A1 | 4/2017 | Wallman et al. | |

FOREIGN PATENT DOCUMENTS

| | | |
|---|---|---|
| CN | 103817661 A | 5/2014 |
| CN | 207921546 U | 9/2018 |
| CN | 209352545 U | 9/2019 |
| CN | 110960294 A | 4/2020 |
| CN | 214197443 U | 9/2021 |
| CN | 214213625 U | 9/2021 |
| CN | 114451964 A | 5/2022 |
| CN | 217162313 U | 8/2022 |
| CN | 115670673 A | 2/2023 |
| CN | 218623125 U | 3/2023 |
| CN | 219147913 U | 6/2023 |
| CN | 116421315 A | 7/2023 |
| FR | 2593583 A1 | 7/1987 |
| GB | 727572 A | 4/1955 |
| KR | 20030052230 A | 6/2003 |
| WO | 2021143622 A1 | 7/2021 |

* cited by examiner

CONNECTION DEVICE AND SURGICAL NAVIGATION SYSTEM

CROSS-REFERENCE TO THE RELATED APPLICATIONS

This application is the national phase entry of International Application No. PCT/CN2024/097391, filed on Jun. 5, 2024, which is based upon and claims priority to Chinese Patent Application No. 202310699928.2, filed on Jun. 14, 2023, the entire contents of which are incorporated herein by reference.

TECHNICAL FIELD

The present invention relates to the technical field of medical instruments, and specifically, to a connection device and a surgical navigation system.

BACKGROUND

With the popularization of digital technology, in an oral surgery, a precise surgical operation can be carried out by putting a special instrument into the mouth of a patient. Due to a limited oral space, it is impossible to accurately obtain the position of the instrument after the instrument is put into the mouth, causing an increased surgical risk and a poorer postoperative effect.

SUMMARY

Technical Problem

At present, a mechanical navigation device is usually used to obtain position information. The suitability of a cascade tube on the mechanical navigation device is related to the accuracy of entire navigation. In the existing technology, a length of the cascade tube in a surgical navigation system is usually not adjustable. When a patient has muscular and fatty cheeks, a length of a part, extending out of the mouth, of the cascade tube cannot meet a clinical need. Even if the cascade tube is fixed, the cascade tube may be loosened during the operation due to the impact of the cheek muscles or the impact of a thickness of the cheek fat, resulting in an error and a serious impact.

Technical Solution

The present invention aims to solve the problem that a length of a cascade tube in an existing surgical navigation system is not adjustable.

To solve the above problems, the present invention adopts the following technical solutions:

A connection device, configured to connect two adjacent cascade tubes of a surgical navigation system. The connection device includes: a connection tube, a butting tube, a sleeve, and a plurality of positioning balls; the connection tube and the butting tube are respectively arranged at two ends of the cascade tubes; the butting tube on one of the cascade tubes is configured to sleeve the connection tube on the other cascade tube;

the connection tube is provided with a connection protrusion; a connection slot communicated to the inside of the butting tube is provided in an inner wall of the butting tube; an opening of the connection slot is oriented away from one end of the cascade tube and is matched with the connection protrusion; when the butting tube sleeves the connection tube, the connection protrusion is configured to move from the opening of the connection slot into the connection slot;

ball connection slots that are matched with the positioning balls are provided in an outer wall of the connection tube; ball butting holes that are matched with the positioning balls are provided in a side wall of the butting tube in a penetrating manner; when the butting tube sleeves the connection tube, the ball butting holes are configured to be aligned with the ball connection slots to form positioning ball slots;

a ring slot is provided in an inner wall of the sleeve in a circumferential direction of the sleeve; the plurality of positioning balls are movably arranged in the ring slot; and when the butting tube sleeves the connection tube, the sleeve is configured to sleeve the butting tube, so that the positioning balls are clamped in the positioning ball slots.

Beneficial Effects

Compared with the existing technology, the connection device according to the present invention has, but not limited to, the following beneficial effects:

When the cascade tubes in the surgical navigation system are short, more cascade tubes can be added, and two adjacent cascade tubes are connected through the connection device. During mounting, the butting tube on one cascade tube sleeves an outer wall of the connection tube on the other cascade tube, and the connection protrusion on the connection tube moves from the opening of the connection slot in the inner wall of the butting tube into the connection slot, to achieve preliminary fixed connection and align the ball butting holes with the ball connection slots to form the positioning ball slots. Afterwards, the sleeve that originally sleeves the butting tube and is away from the ball butting holes is moved to a position, directly facing the positioning ball slots, on the butting tube, so that the ring slot in the sleeve is aligned with the positioning ball slots. Then, the sleeve is rotated. In the rotation process of the sleeve, the positioning balls are driven to move in the ring slot, and the positioning balls are caused to move into the positioning ball slots, so that secondary fixed connection is then achieved. The ball connection slots and the ball butting holes are configured to accommodate the positioning balls and limit positions of the positioning balls, which ensures that the positioning balls are always in ideal positions. The mutual cooperation between the connection protrusion and the connection slot achieves the preliminary fixed connection, and the mutual cooperation between the sleeve, the positioning balls, and the positioning ball slots achieves secondary fixed connection to prevent relative rotation between the connection tube and the butting tube. On the one hand, the two fixed connections are conductive to adjusting the lengths of the cascade tubes, so that a user can adjust the lengths of the cascade tubes in the surgical navigation system according to an actual situation. On the other hand, it is conductive to reducing a gap between connected parts of two adjacent cascade tubes during connection, so as to improve the stability of connection, improve the connection accuracy, and reduce an error.

Preferably, the connection tube includes a fixed tube, a connection ring, and connection teeth; the connection protrusion is arranged on an outer wall of the connection ring; the connection teeth are arranged at one end of the connection ring in a protruding manner in an axial direction of the connection ring; the plurality of connection teeth are uniformly spaced apart in a square shape in a circumferential direction of the connection ring;

the fixed tube is configured for fixed connection with the cascade tubes; the ball connection slots are provided in an outer wall of the fixed tube; tooth slots that are matched with the connection teeth are provided in one end of the fixed tube facing the butting tube; and the connection teeth are configured to be plugged into the tooth slots and are connected in a cold-welding manner.

Preferably, each connection tooth includes a tip part, a middle part, and a root part; the root part is fixed to an end portion of the connection ring; the middle part is configured to be connected between the tip part and the root part; a cross section of the tip part is of a triangular structure; a cross section of the middle part is of an isosceles trapezoidal structure; a cross section of the root part is of a rectangular structure; one end of a long bottom edge of the cross section of the middle part is connected to the root part; one end of a short bottom edge of the cross section of the middle part is connected to the tip part; and a width of the root part is matched with a width of each tooth slot.

Preferably, the connection slot includes a first sliding chute, a second sliding chute, and a third sliding chute; the first sliding chute is arranged in an axial direction of the butting tube, and an opening of the first sliding chute penetrates through an end portion of the butting tube; one end of the first sliding chute away from the end portion of the butting tube is connected with the second sliding chute perpendicular to the first sliding chute; the third sliding chute is arranged in the axial direction of the butting tube; and the third sliding chute is connected to one end of the second sliding chute away from the first sliding chute and is inversed to the first sliding chute.

Preferably, the connection slot further includes a limiting slot collinear with the third sliding chute, and the limiting slot is provided in one end of the third sliding chute close to the second sliding chute.

Preferably, a threaded slot is provided in an inner wall of one end of the cascade tube away from the connection tube; a connection thread matched with the threaded slot is formed on an outer wall of one end of the butting tube; and the butting tube is in threaded connection with the cascade tube.

Preferably, the connection device further includes an auxiliary spring; a spring slot is further provided in an inner wall of one end of the cascade tube away from the connection tube; the spring slot is communicated to the threaded slot; the auxiliary spring is mounted in the spring slot; and one end of the auxiliary spring resists against an inner wall of the spring slot, and the other end resists against the end portion of the butting tube.

Preferably, the plurality of ball connection slots are provided in the outer wall of the connection tube in a uniform spacing manner in a circumferential direction of the connection tube, and the ball connection slots are arranged in a plurality of rows; two adjacent rows of the ball connection slots are distributed in a staggered manner; and the ball butting holes are matched with the ball connection slots.

Preferably, the connection device further includes a limiting ring; the limiting ring is fixed on an outer wall of one end of the butting tube close to the ball butting holes; and an outer diameter of the limiting ring is greater than an inner diameter of the sleeve.

The present invention further provides a surgical navigation system, including a cascade tube and the above connection device; the cascade tube includes a straight tube, a first bent tube, and a second bent tube; the first bent tube and the second bent tube are respectively fixedly connected to two ends of the straight tube; the connection tube of the connection device is fixedly connected to the first bent tube; and the butting tube of the connection device is in threaded connection with the second bent tube.

Compared with the existing technology, the beneficial effects of the surgical navigation system are consistent with those of the connection device, and will not be elaborated here.

DESCRIPTIONS OF REFERENCE NUMERALS

Figure 1:
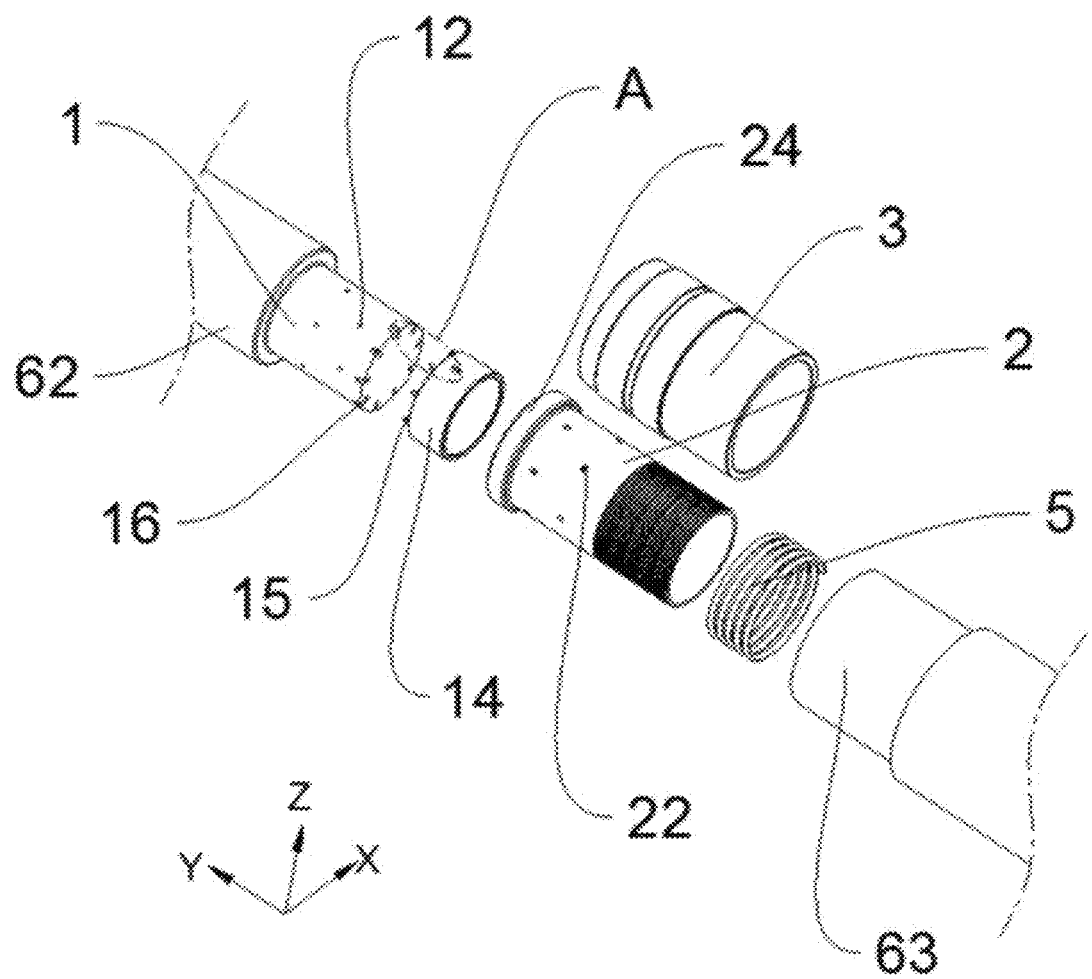
FIG. 1 is a schematic diagram of an entire structure of a connection device according to an embodiment of the present invention.

1: connection tube; 11: connection protrusion; 12: ball connection slot; 13: fixed tube; 14: connection ring; 15: connection tooth; 151: tip part; 152: middle part; 153: root part; 16: tooth slot; 2: butting tube; 21: connection slot; 211: first sliding chute; 212: second sliding chute; 213: third sliding chute; 214: limiting slot; 22: ball butting hole; 23: limiting ring; 24: connection thread; 3: sleeve; 30: ring slot; 4: positioning ball; 5: auxiliary spring; 50: spring slot; 6: cascade tube; 61: straight tube; 62: first bent tube; 63: second bent tube; and 64: swivel bearing.

DETAILED DESCRIPTION OF THE EMBODIMENTS

Implementations of the present application will be described in detail below in conjunction with accompanying drawings and embodiments. The following embodiments are used for explaining the present application, but not intended to limit the scope of the present application.

In the description of the present invention, it should be understood that orientations or positional relationships indicated by the terms "upper", "lower", "front", "rear", "left", "right", and the like are orientations or positional relationships as shown in the drawings, and are only for the purpose of facilitating and simplifying the description of the present invention instead of indicating or implying that components or elements indicated must have particular orientations, and be constructed and operated in the particular orientations, so that these terms are not construed as limiting the present invention.

It should be noted that in a coordinate system XYZ provided herein, the positive X-axis represents the right; the negative X-axis represents the left; the positive Y-axis represents the front; the negative Y-axis represents the back; the positive Z-axis represents the top; and the negative Z-axis represents the bottom. Meanings of Z-axis, X-axis, and Y-axis are only for the convenience of describing the present invention and simplifying the description, and do not indicate or imply that the components or elements referred to need have a specific orientation and be constructed and operated in a specific orientation. Therefore, they may not be understood as limiting the present invention.

Referring to FIG. 1 to FIG. 5, the present invention provides a connection device, configured to connect two adjacent cascade tubes 6 of a surgical navigation system. The connection device includes: a connection tube 1, a butting tube 2, a sleeve 3, and a plurality of positioning balls 4. The connection tube 1 and the butting tube 2 are respectively arranged at two ends of the cascade tubes 6; and the butting tube 2 on one of the cascade tubes 6 is configured to sleeve the connection tube 1 on the other cascade tube 6.

Figure 2:
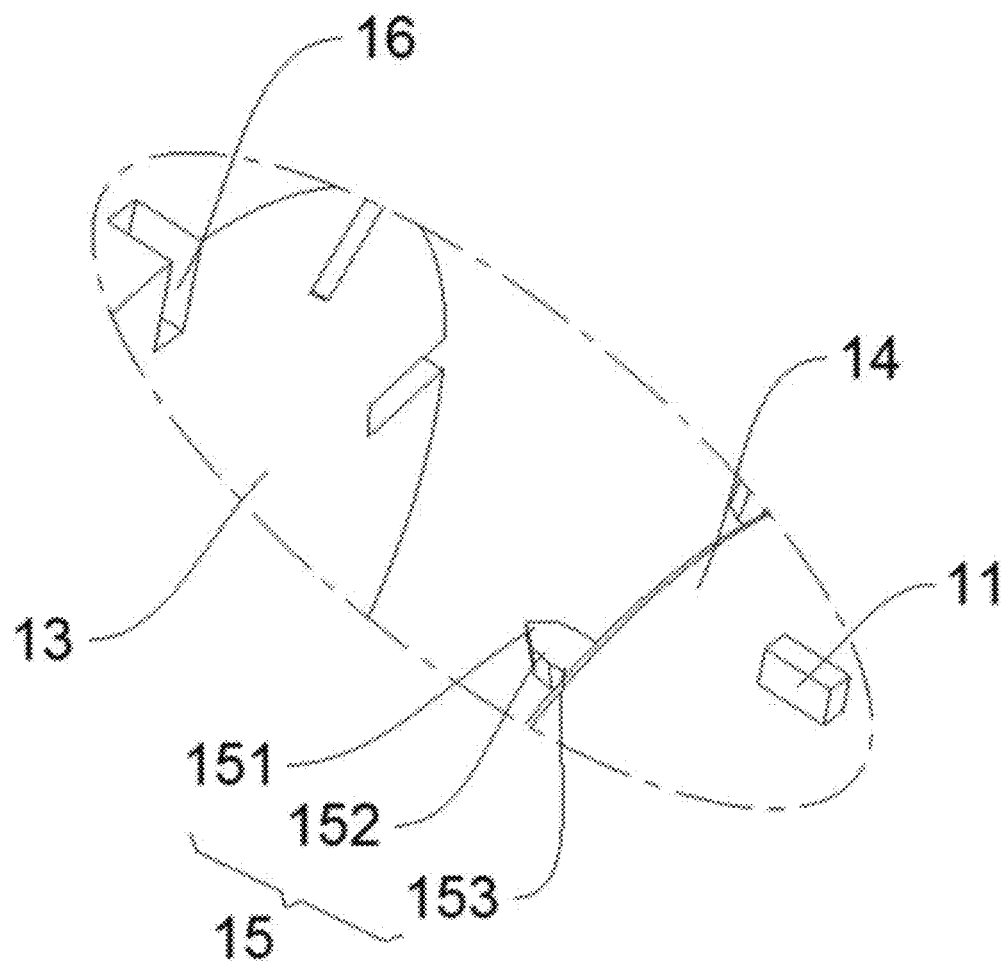
FIG. 2 is a partially structural enlarged view of part A in FIG. 1 according to an embodiment of the present invention.
Figure 3:
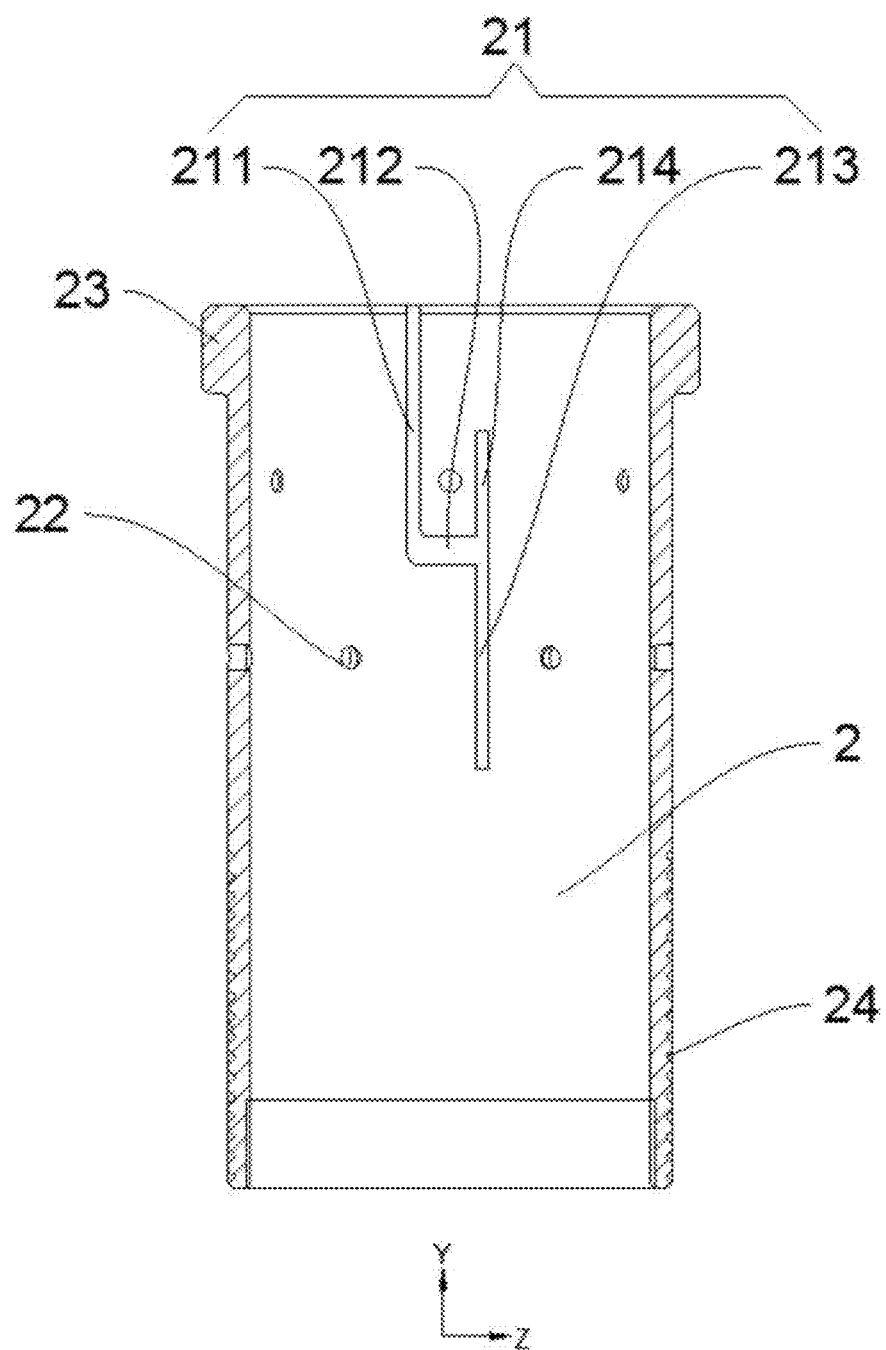
FIG. 3 is a schematic sectional structural diagram of a butting tube according to an embodiment of the present disclosure.

Referring to FIG. 2 and FIG. 3, the connection tube 1 is provided with a connection protrusion 11; a connection slot 21 communicated to the inside of the butting tube 2 is provided in an inner wall of the butting tube 2; and an opening of the connection slot 21 is oriented away from one end of the cascade tube 6, and the connection slot 21 is matched with the connection protrusion 11. When butting tube 2 sleeves the connection tube 1, the connection protrusion 11 is configured to move from the opening of the connection slot 21 into the connection slot 21.

Figure 4:
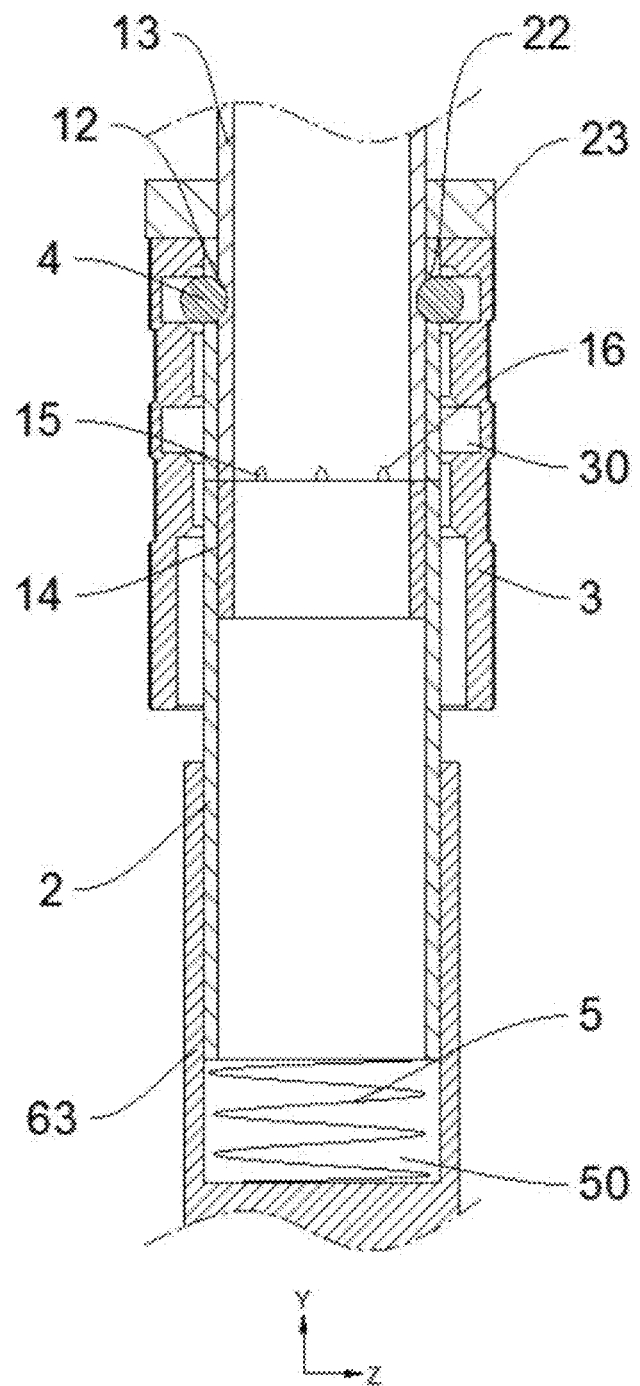
FIG. 4 is a schematic diagram of an entire sectional structure of a connection device according to an embodiment of the present invention.

Referring to FIG. 4, ball connection slots 12 that are matched with the positioning balls 4 are provided in an outer wall of the connection tube 1. Ball butting holes 22 that are matched with the positioning balls 4 are provided in a side wall of the butting tube 2 in a penetrating manner. When the butting tube 2 sleeves the connection tube 1, the ball butting holes 22 are configured to be aligned with the ball connection slots 12 to form positioning ball slots.

Referring to FIG. 4, a ring slot 30 is provided in an inner wall of the sleeve 3 in a circumferential direction of the sleeve 3. The plurality of positioning balls 4 are movably arranged in the ring slot 30. When the butting tube 2 sleeves the connection tube 1, the sleeve 3 is configured to sleeve the butting tube 2, so that the positioning balls 4 are clamped in the positioning ball slots.

In this embodiment, when the cascade tubes 6 in the surgical navigation system are short, more cascade tubes 6 can be added, and two adjacent cascade tubes 6 are connected through the connection device. During mounting, the butting tube 2 on one cascade tube 6 sleeves an outer wall of the connection tube 1 on the other cascade tube 6, and the connection protrusion 11 on the connection tube 1 moves from the opening of the connection slot 21 in the inner wall of the butting tube into the connection slot 2 into the connection slot 21, to achieve preliminary fixed connection and align the ball butting holes 22 with the ball connection slots 12 to form the positioning ball slots. Afterwards, the sleeve 3 that originally sleeves the butting tube 2 and is away from the ball butting holes 22 is moved to a position, directly facing the positioning ball slots, on the butting tube 2, so that the ring slot 30 in the sleeve 3 is aligned with the positioning ball slots. Then, the sleeve 3 is rotated. In the rotation process of the sleeve 3, the positioning balls 4 are driven to move in the ring slot 30, and the positioning balls 4 are caused to move into the positioning ball slots, so that secondary fixed connection is then achieved. The ball connection slots 12 and the ball butting holes 22 are configured to accommodate the positioning balls 4 and limit positions of the positioning balls 4, which ensures that the positioning balls 4 are always in ideal positions. The mutual cooperation between the connection protrusion 11 and the connection slot 21 achieves the preliminary fixed connection, and the mutual cooperation between the sleeve 3, the positioning balls 4, and the positioning ball slots achieves secondary fixed connection to prevent relative rotation between the connection tube 1 and the butting tube 2. On the one hand, the two fixed connections are conductive to adjusting the lengths of the cascade tubes, so that a user can adjust the lengths of the cascade tubes in the surgical navigation system according to an actual situation. On the other hand, it is conductive to reducing a gap between connected parts of two adjacent cascade tubes during connection, so as to improve the stability of connection, improve the connection accuracy, and reduce an error.

Referring to FIG. 1 to FIG. 2, preferably, the connection tube 1 includes a fixed tube 13, a connection ring 14, and connection teeth 15. The connection protrusion 11 is arranged on an outer wall of the connection ring 14. The connection teeth 15 are arranged at one end of the connection ring 14 in a protruding manner in an axial direction of the connection ring 14. The plurality of connection teeth 15 are uniformly spaced apart in a square shape in a circumferential direction of the connection ring 14.

The fixed tube 13 is configured for fixed connection with the cascade tubes 6. The ball connection slots 12 are provided in an outer wall of the fixed tube 13. Tooth slots 16 that are matched with the connection teeth 15 are provided in one end of the fixed tube 13 facing the butting tube 2. The connection teeth 15 are configured to be plugged into the tooth slots 16 and are connected in a cold-welding manner.

Specifically, the connection teeth 15 are arranged in one-to-one correspondence with the tooth slots 16. When the connection device is connected at a preset position, the connection teeth 15 are engaged with the tooth slots 16 one by one.

In this embodiment, during mounting, the connection protrusion 11 on the connection ring 14 is first aligned with the opening of the connection slot 21 on the butting tube 2. Then, the connection ring 14 is moved into the butting tube 2, and the connection protrusion 11 is moved into the connection slot 21 to prevent the connection ring 14 from rotating in the butting tube 2. Afterwards, the connection ring 14 is connected to the fixed tube 13, namely, the connection teeth 15 on the connection ring 14 are plugged into the tooth slots 16 and are connected in a cold-welding manner. The arrangement of the connection protrusion 11 and the connection slot 21 is conductive to preventing a rotation vacancy in the connection device. During actual use, if the connection protrusion 11 is directly arranged on the fixed tube 13, it cannot ensure that the connection protrusion is aligned with the connection slot 21 during mounting. Therefore, by the arrangement of the connection ring 14, during mounting, the connection ring 14 can be first rotated to first align the connection protrusion 11 to the connection slot 21 and is mounted in the butting tube 2. Then, the connection teeth 15 are connected to the tooth slots 16 to fix the connection ring 14 on the fixed tube 13. This structure is conductive to adjusting a circumferential position of the connection protrusion 11, so that the connection protrusion 11 can be aligned with the opening of the connection slot 21, to improve the convenience of mounting.

Referring to FIG. 2, preferably, each connection tooth 15 includes a tip part 151, a middle part 152, and a root part 153; the root part 153 is fixed to an end portion of the connection ring 14; the middle part 152 is configured to be connected between the tip part 151 and the root part 153; a cross section of the tip part 151 is of a triangular structure; a cross section of the middle part 152 is of an isosceles trapezoidal structure; a cross section of the root part 153 is of a rectangular structure; one end of a long bottom edge of the cross section of the middle part 152 is connected to the root part 153; one end of a short bottom edge of the cross section of the middle part 152 is connected to the tip part 151; and a width of the root part 153 is matched with a width of each tooth slot 16.

Specifically, the tip part 151 is an isosceles triangle, the bottom edge of one end of the cross section of the middle part 152 has a consistent edge length with the bottom edge of the triangle of the tip part 151. An edge length of the bottom edge of the other end of the cross section of the middle part 152 is consistent with a width of the root part 153. When the connection tooth 15 is plugged into the tooth slot 16, the root part 153 is configured to provide a friction force with the tooth slot 16, so that the connection tooth 15 and the tooth slot 16 are engaged with each other.

An acute angle formed by a waistline of the cross section of the tip part 151 of the connection tooth 15 and an axis of the connection ring 14 is 40 degrees, and an acute angle formed by a waistline of the cross section of the middle part 152 and the axis of the connection ring 14 is 8 degrees. This structure is conducive to quickly plugging the connection tooth 15 into the tooth slot 16.

In this embodiment, the arrangement of the tip part 151, the middle part 152, and the root part 153 facilitates the quick plugging of the connection tooth 15 into the tooth slot 16, to maintain friction with the tooth slot 16 through the root part 153. In addition, the cold-welding effect is beneficial for enhancing the connection between the connection ring 14 and the fixed tube 13.

Referring to FIG. 3, preferably, the connection slot 21 includes a first sliding chute 211, a second sliding chute 212, and a third sliding chute 213; the first sliding chute 211 is arranged in an axial direction of the butting tube 2, and an opening of the first sliding chute 211 penetrates through an end portion of the butting tube 2; one end of the first sliding chute 211 away from the end portion of the butting tube 2 is connected with the second sliding chute 212 perpendicular to the first sliding chute 211; the third sliding chute 213 is arranged in the axial direction of the butting tube 2; and the third sliding chute 213 is connected to one end of the second sliding chute 212 away from the first sliding chute 211 and is inversed to the first sliding chute 211.

Specifically, one end of the connection protrusion 11 away from the fixed tube 13 is a first end, and the other end is a second end. A cross-sectional width of the first end is less than that of the second end. A width of the first sliding chute 211 is greater than a cross-sectional width of the second end of the connection protrusion 11, which facilitates the connection protrusion 11 to smoothly enter the connection slot 21 from the opening of the first sliding chute 211. A connection between the second sliding chute 212 and the first sliding chute 211 is provided with a circular arc structure, and a width of the second sliding chute 212 is greater than a length of the connection protrusion 11, which facilitates rotation when the connection ring 14 is located at the deepest part of the first sliding chute 211, so that the connection protrusion 11 can be twisted towards the second sliding chute 212. A width of one end of the third sliding chute 213 close to the second sliding chute 212 is greater than the cross-sectional width of the second end of the connection protrusion 11. A width of one end of the third sliding chute 213 away from the second sliding chute 212 is matched with the cross-sectional width of the first end of the connection protrusion 11. Two waistlines of the third sliding chute 213 are respectively parallel to the two waistlines of the connection protrusion 11, so as to facilitate the connection protrusion 11 to move to the third sliding chute 213 to achieve fixed clamping.

In this embodiment, the connection protrusion 11, the first sliding chute 211, the second sliding chute 212, and the third sliding chute 213 cooperate with each other, so that the connection ring 14 achieves preliminary fixation with the butting tube 2 by movement and rotation when the connection ring is inserted into the butting tube 2, which is conducive to strengthening the fixing effect.

Referring to FIG. 3, preferably, the connection slot 21 further includes a limiting slot 214 collinear with the third sliding chute 213, and the limiting slot 214 is provided in one end of the third sliding chute 213 close to the second sliding chute 212.

In this embodiment, due to the arrangement of the limiting slot 214, it is conductive to preventing the connection protrusion 11 from falling off from the connection slot 21, thus facilitating prevention of the connection tube 1 from falling off from the butting tube 2.

Referring to FIG. 3, preferably, a threaded slot is provided in an inner wall of one end of the cascade tube 6 away from the connection tube 1; a connection thread 24 matched with the threaded slot is formed on an outer wall of one end of the butting tube 2; and the butting tube 2 is in threaded connection with the cascade tube 6.

In this embodiment, the butting tube 2 is in threaded connection to the end of the cascade tube 6 away from the connection tube 1. By this structure, the butting tube 2 is detachably mounted on the cascade tube 6, to improve the convenience of mounting or removal for a user.

Referring to FIG. 4, preferably, the connection device further includes an auxiliary spring 5; a spring slot 50 is further provided in an inner wall of one end of the cascade tube 6 away from the connection tube 1; the spring slot 50 is communicated to the threaded slot; the auxiliary spring 5 is mounted in the spring slot 50; and one end of the auxiliary spring 5 resists against an inner wall of the spring slot 50, and the other end resists against the end portion of the butting tube 2.

Specifically, one end of the auxiliary spring 5 can further sleeve the butting tube 2 and is fixedly connected to the outside of the butting tube 2, and the other end of the auxiliary spring 5 resists against the inner wall of the spring slot 50, so that the auxiliary spring 5 is connected between the butting tube 2 and the inner wall of the spring slot 50.

In this embodiment, after the connection thread 24 is tightened, the auxiliary spring 5 is pushed to apply a force to the butting tube 2 towards the connection tube 1, which is conducive to avoiding an axial vacancy generated after the butting tube 2 and the cascade tube 6 are tightened.

Referring to FIG. 1, preferably, the plurality of ball connection slots 12 are provided in the outer wall of the connection tube 1 in a uniform spacing manner in a circumferential direction of the connection tube, and the ball connection slots 12 are arranged in a plurality of rows; two adjacent rows of the ball connection slots 12 are distributed in a staggered manner; and the ball butting holes 22 are matched with the ball connection slots 12.

Specifically, a number of the positioning balls 4 is consistent with a number of the ball connection slots 12.

In this embodiment, two adjacent rows of the ball connection slots 12 are distributed in a staggered manner, so that two adjacent rows of positioning ball slots are also distributed in a staggered manner. The positioning balls 4 are clamped into the staggered positioning ball slots, which is conducive to improving the stability of secondary connection.

Referring to FIG. 3 to FIG. 4, preferably, the connection device further includes a limiting ring 23; the limiting ring 23 is fixed on an outer wall of one end of the butting tube 2 close to the ball butting holes 22; and an outer diameter of the limiting ring 23 is greater than an inner diameter of the sleeve 3.

In this embodiment, due to the arrangement of the limiting ring 23, it is conductive to preventing the sleeve 3 from falling off from the butting tube 2.

Figure 5:
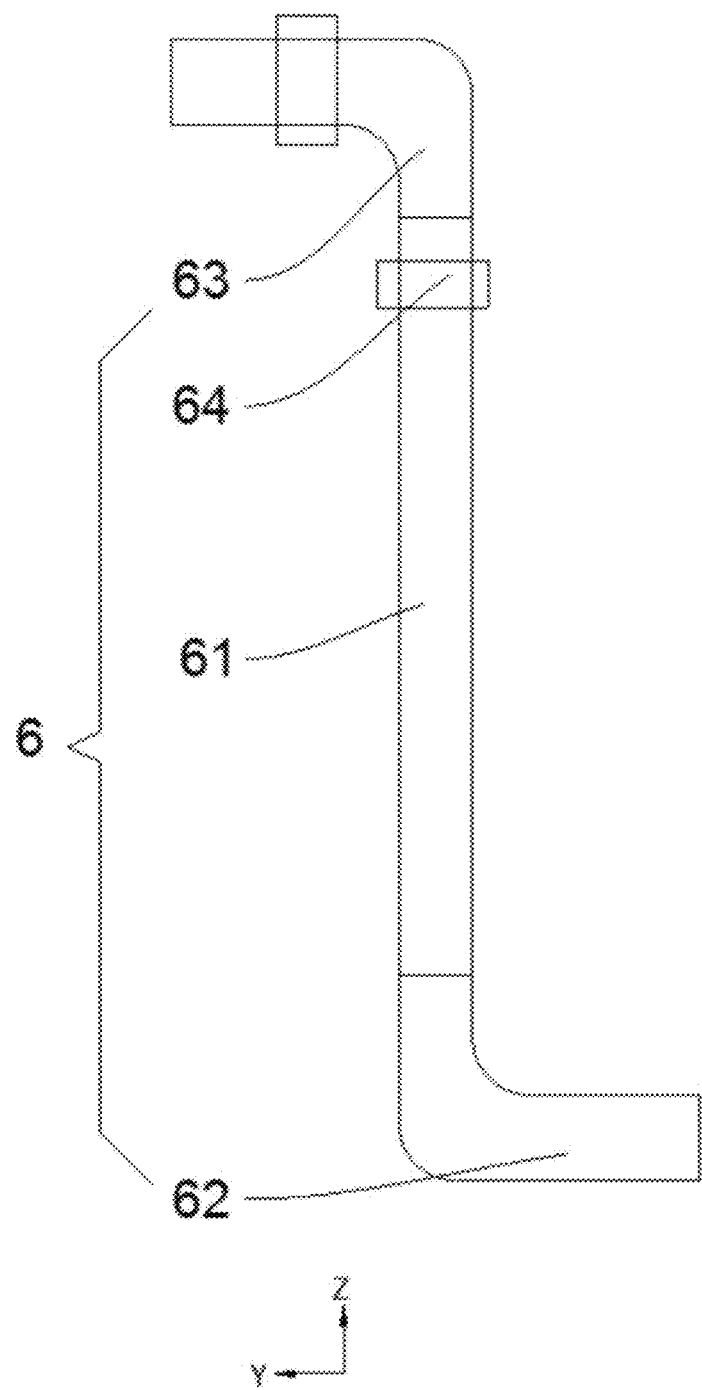
FIG. 5 is a schematic structural diagram of a cascade tube of a surgical navigation system according to an embodiment of the present invention.

Referring to FIG. 5, the present invention further provides a surgical navigation system, including a cascade tube 6 and the above connection device; the cascade tube 6 includes a straight tube 61, a first bent tube 62, and a second bent tube 63; the first bent tube 62 and the second bent tube 63 are respectively fixedly connected to two ends of the straight tube 61; the connection tube 1 of the connection device is fixedly connected to the first bent tube 62; and the butting tube 2 of the connection device is in threaded connection with the second bent tube 63.

Compared with the existing technology, the beneficial effects of the surgical navigation system are consistent with those of the connection device, and will not be elaborated here.

Referring to FIG. 5, the surgical navigation system further includes a swivel bearing 64, a sensor, and an operating device. The swivel bearing 64 is arranged on the second bent tube 63 and the straight tube 61 to enable the cascade tube 6 to rotate according to an actual need, thereby ensuring an accurate navigation position. The operating device is arranged at a tail end of the last cascade tube 6 of the surgical navigation system. The operating device is configured to extend into an oral cavity and perform surgery on the oral cavity.

In this embodiment, the sensor is configured to: obtain a position of the cascade tube 6 and calculate and locate the operating device, and the precise position of the operating device is presented through coordinates, so as to perform ranging, leveling and orientation determination in a surgery, which is conducive to improving the accuracy of the surgical navigation system in use and improving the surgical safety.

Although the present invention is as described above, the scope of protection of the present invention is not limited to this. For those skilled in the art, various changes and modifications can be made without departing from the spirit and scope of the present invention, and these changes and modifications shall fall within the scope of protection of the present invention.

What is claimed is:

1. A connection device, configured to connect two adjacent cascade tubes of a surgical navigation system, wherein the connection device comprises: a connection tube, a butting tube, a sleeve, and a plurality of positioning balls; the connection tube and the butting tube are configured to be respectively arranged and connected at two ends of the two adjacent cascade tubes; the butting tube configured to be on a first one of the two adjacent cascade tubes and is configured to sleeve the connection tube on a second one of the two adjacent cascade tubes;

the connection tube is provided with a connection protrusion; a connection slot communicated to an inside of the butting tube is provided in an inner wall of the butting tube; an opening of the connection slot is configured to be oriented away from one end of the first one of the two adjacent cascade tubes, and the connection slot is matched with the connection protrusion; when the butting tube sleeves the connection tube, the connection protrusion is configured to move from the opening of the connection slot into the connection slot;

ball connection slots that are matched with the plurality of positioning balls are provided in an outer wall of the connection tube; ball butting holes that are matched with the plurality of positioning balls are provided in a side wall of the butting tube in a penetrating manner; when the butting tube sleeves the connection tube, the ball butting holes are configured to be aligned with the ball connection slots to form positioning ball slots;

a ring slot is provided in an inner wall of the sleeve in a circumferential direction of the sleeve; the plurality of positioning balls are movably arranged in the ring slot; and when the butting tube sleeves the connection tube, the sleeve is configured to sleeve the butting tube, wherein the plurality of positioning balls are clamped in the positioning ball slots; wherein the connection tube comprises a fixed tube, a connection ring, and connection teeth;

the connection protrusion is arranged on an outer wall of the connection ring; the connection teeth are arranged at one end of the connection ring in a protruding manner in an axial direction of the connection ring; the plurality of connection teeth are uniformly spaced apart in a square shape in a circumferential direction of the connection ring;

the fixed tube is configured for fixed connection with the two adjacent cascade tubes; the ball connection slots are provided in an outer wall of the fixed tube; tooth slots that are matched with the connection teeth are provided in one end of the fixed tube facing the butting tube; and the connection teeth are configured to be plugged into the tooth slots and are connected in a cold-welding manner.

2. The connection device according to claim 1, wherein each connection tooth comprises a tip part, a middle part, and a root part; the root part is fixed to an end portion of the connection ring; the middle part is configured to be connected between the tip part and the root part; a cross section of the tip part is of a triangular structure; a cross section of the middle part is of an isosceles trapezoidal structure; a cross section of the root part is of a rectangular structure; one end of a long bottom edge of the cross section of the middle part is connected to the root part; one end of a short bottom edge of the cross section of the middle part is connected to the tip part; and a width of the root part is matched with a width of each tooth slot.

3. The connection device according to claim 1, wherein the connection slot comprises a first sliding chute, a second sliding chute, and a third sliding chute; the first sliding chute is arranged in an axial direction of the butting tube, and an opening of the first sliding chute penetrates through an end portion of the butting tube; one end of the first sliding chute away from the end portion of the butting tube is connected with the second sliding chute perpendicular to the first sliding chute; the third sliding chute is arranged in the axial direction of the butting tube; and the third sliding chute is connected to one end of the second sliding chute away from the first sliding chute and is inversed to the first sliding chute.

4. The connection device according to claim 3, wherein the connection slot further comprises a limiting slot collinear with the third sliding chute, and the limiting slot is provided in one end of the third sliding chute adjacent to the second sliding chute.

5. The connection device according to claim 1, wherein a threaded slot is configured to be provided in an inner wall of one end of each of the two adjacent cascade tubes away from the connection tube; a connection thread matched with the threaded slot is formed on an outer wall of one end of the butting tube; and the butting tube is configured to be in threaded connection with each of the two adjacent cascade tubes.

6. The connection device according to claim 5, further comprising an auxiliary spring, wherein a spring slot is configured to be further provided in an inner wall of the one end of each of the two adjacent cascade tubes away from the connection tube; the spring slot is communicated to the threaded slot; the auxiliary spring is mounted in the spring slot; and a first end of the auxiliary spring resists against an inner wall of the spring slot, and a second end of the auxiliary spring resists against an end portion of the butting tube.

7. The connection device according to claim 1, wherein the plurality of ball connection slots are provided in the outer wall of the connection tube in a uniform spacing manner in a circumferential direction of the connection tube, and the ball connection slots are arranged in a plurality of rows; two adjacent rows of the ball connection slots are distributed in a staggered manner; and the ball butting holes are matched with the ball connection slots.

8. The connection device according to claim 1, further comprising a limiting ring, wherein the limiting ring is fixed on an outer wall of one end of the butting tube adjacent to the ball butting holes; and an outer diameter of the limiting ring is greater than an inner diameter of the sleeve.

9. A surgical navigation system, comprising a cascade tube and the connection device according to claim 1, wherein the cascade tube comprises a straight tube, a first bent tube, and a second bent tube; the first bent tube and the second bent tube are respectively fixedly connected to two ends of the straight tube; the connection tube of the connection device is fixedly connected to the first bent tube; and the butting tube of the connection device is in threaded connection with the second bent tube.

10. The surgical navigation system according to claim 9, wherein in the connection device, each connection tooth comprises a tip part, a middle part, and a root part; the root part is fixed to an end portion of the connection ring; the middle part is configured to be connected between the tip part and the root part; a cross section of the tip part is of a triangular structure; a cross section of the middle part is of an isosceles trapezoidal structure; a cross section of the root part is of a rectangular structure; one end of a long bottom edge of the cross section of the middle part is connected to the root part; one end of a short bottom edge of the cross section of the middle part is connected to the tip part; and a width of the root part is matched with a width of each tooth slot.

11. The surgical navigation system according to claim 9, wherein in the connection device, the connection slot comprises a first sliding chute, a second sliding chute, and a third sliding chute; the first sliding chute is arranged in an axial direction of the butting tube, and an opening of the first sliding chute penetrates through an end portion of the butting tube; one end of the first sliding chute away from the end portion of the butting tube is connected with the second sliding chute perpendicular to the first sliding chute; the third sliding chute is arranged in the axial direction of the butting tube; and the third sliding chute is connected to one end of the second sliding chute away from the first sliding chute and is inversed to the first sliding chute.

12. The surgical navigation system according to claim 11, wherein in the connection device, the connection slot further comprises a limiting slot collinear with the third sliding chute, and the limiting slot is provided in one end of the third sliding chute adjacent to the second sliding chute.

13. The surgical navigation system according to claim 9, wherein in the connection device, a threaded slot is configured to be provided in an inner wall of one end of each of the two adjacent cascade tubes away from the connection tube; a connection thread matched with the threaded slot is formed on an outer wall of one end of the butting tube; and the butting tube is configured to be in threaded connection with each of the two adjacent cascade tubes.

14. The surgical navigation system according to claim 13, wherein the connection device further comprises an auxiliary spring, wherein a spring slot is configured to be further provided in an inner wall of the one end of each of the two adjacent cascade tubes away from the connection tube; the spring slot is communicated to the threaded slot; the auxiliary spring is mounted in the spring slot; and a first end of the auxiliary spring resists against an inner wall of the spring slot, and a second end of the auxiliary spring resists against an end portion of the butting tube.

15. The surgical navigation system according to claim 9, wherein in the connection device, the plurality of ball connection slots are provided in the outer wall of the connection tube in a uniform spacing manner in a circumferential direction of the connection tube, and the ball connection slots are arranged in a plurality of rows; two adjacent rows of the ball connection slots are distributed in a staggered manner; and the ball butting holes are matched with the ball connection slots.

16. The surgical navigation system according to claim 9, wherein the connection device further comprises a limiting ring, wherein the limiting ring is fixed on an outer wall of one end of the butting tube adjacent to the ball butting holes; and an outer diameter of the limiting ring is greater than an inner diameter of the sleeve.

* * * * *